United States Patent
Li et al.

(10) Patent No.: US 12,119,716 B2
(45) Date of Patent: Oct. 15, 2024

(54) POWER TOOL AND CONTROL METHOD THEREOF

(71) Applicant: Nanjing Chervon Industry Co., Ltd., Nanjing (CN)

(72) Inventors: Guang Li, Nanjing (CN); Yanqing Xu, Nanjing (CN); Yongkang Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 31 days.

(21) Appl. No.: 17/903,439

(22) Filed: Sep. 6, 2022

(65) Prior Publication Data

US 2023/0125520 A1      Apr. 27, 2023

(51) Int. Cl.
| | | |
|---|---|---|
| *H02K 11/33* | (2016.01) | |
| *B25F 5/00* | (2006.01) | |
| *H02K 11/21* | (2016.01) | |
| *H02P 3/06* | (2006.01) | |

(52) U.S. Cl.
CPC ............. *H02K 11/33* (2016.01); *B25F 5/001* (2013.01); *H02K 11/21* (2016.01); *H02P 3/06* (2013.01)

(58) Field of Classification Search
CPC ................................. B25F 5/00; B25F 5/001
See application file for complete search history.

(56) References Cited

U.S. PATENT DOCUMENTS

| | | | |
|---|---|---|---|
| 2010/0065293 A1 | 3/2010 | Lohr | |
| 2020/0389108 A1 | 12/2020 | Yajurvedi | |
| 2021/0094158 A1* | 4/2021 | Kato | B25B 23/147 |
| 2023/0078403 A1* | 3/2023 | Liu | H02P 21/18 |
| | | | 318/400.02 |

FOREIGN PATENT DOCUMENTS

EP           3756827 A1      12/2020

OTHER PUBLICATIONS

EPO, extended European search report issued on European patent application No. 22191610.9, dated Mar. 29, 2023, 8 pages.

* cited by examiner

*Primary Examiner* — Daniel Jeremy Leeds
(74) *Attorney, Agent, or Firm* — Greenberg Traurig, LLP

(57) ABSTRACT

A power tool includes a housing, an electric motor, a driver circuit, a speed detection device, and a control device. The driver circuit is electrically connected to the electric motor to drive the electric motor to operate. The speed detection device is configured to acquire a rotational speed of the electric motor. The control device is connected to the speed detection device and the driver circuit and outputs a control signal to the driver circuit to control rotation of the electric motor. The control device is configured to acquire the rotational speed of the electric motor when the electric motor is in a start-up stage, obtain a rotational speed variation of the electric motor within a preset time based on the rotational speed of the electric motor, and turn off the electric motor when the rotational speed variation is less than a rotational speed variation threshold.

18 Claims, 7 Drawing Sheets

POWER TOOL AND CONTROL METHOD THEREOF

RELATED APPLICATION INFORMATION

This application claims the benefit under 35 U.S.C. § 119(a) of Chinese Patent Application No. CN 202111253712.0, filed on Oct. 27, 2021, which application is incorporated herein by reference in its entirety.

BACKGROUND

The output torque of a hand-held power tool such as an electric drill or a screwdriver generally needs to be limited so as to avoid damage to a workpiece or prevent an electric motor from being burnt out. Typically, the electric drill or the screwdriver is provided with a mechanical overload clutch between a tool carrier and the electric motor, so as to limit the output torque. However, the mechanical overload clutch is relatively large in volume and regulates the torque with relatively low accuracy. Alternatively, the output torque is limited by a method of detecting a current. When the current exceeds a threshold, it is considered that the tool is currently under a working condition of excessively large output torque.

SUMMARY

A power tool includes a housing, an electric motor, a driver circuit, a speed detection device, and a control device. The electric motor is disposed in the housing. The driver circuit is electrically connected to the electric motor to drive the electric motor to operate. The speed detection device is configured to acquire a rotational speed of the electric motor. The control device is connected to the speed detection device and the driver circuit and outputs a control signal to the driver circuit to control rotation of the electric motor. The control device is configured to, when the electric motor is in a start-up stage, acquire the rotational speed of the electric motor, estimate a rotational speed variation of the electric motor within a preset time based on the rotational speed of the electric motor, and turn off the electric motor in the case where the rotational speed variation is less than a rotational speed variation threshold.

In some examples, the control device is further configured to control the electric motor to be in the start-up stage in the case where the rotational speed of the electric motor is less than or equal to a preset target rotational speed and control the electric motor to be in an operation stage in the case where the rotational speed of the electric motor is greater than the preset target rotational speed.

In some examples, the control device is configured to, when the electric motor is in the start-up stage, output a first control signal to the driver circuit to control the rotation of the electric motor.

In some examples, the first control signal is configured to be a pulse-width modulation (PWM) signal with a first duty cycle, where the first duty cycle is configured to be a variable and has a preset initial value.

In some examples, the control device is configured to acquire a current of the electric motor, control the first duty cycle to gradually increase from the initial value, and reduce the first duty cycle in the case where the current of the electric motor is greater than or equal to a first current threshold.

In some examples, the control device is configured to, when the electric motor is in the start-up stage, output a second control signal to the driver circuit to control the rotation of the electric motor.

In some examples, the second control signal is configured to be a PWM signal with a second duty cycle, where the second duty cycle is configured to be a fixed value.

In some examples, the control device is configured to acquire a current of the electric motor, turn off the electric motor in the case where the current of the electric motor is greater than or equal to a first current threshold, and power on the electric motor again at a beginning of a next cycle of the second control signal.

In some examples, the power tool further includes a power supply device, where the power supply device is connected to at least the electric motor and configured to supply power to the electric motor.

In some examples, the power tool further includes a torque setting device configured to receive a torque setting instruction inputted by a user to set an upper limit of rotational torque outputted by the power tool.

In some examples, the electric motor includes at least a stator and a rotor, and the control device is further configured to acquire a quadrature-axis target current value perpendicular to a direction of a magnetic field of the rotor when the electric motor is operating.

In some examples, the control device is configured to acquire the quadrature-axis target current value and turn off the electric motor in the case where the quadrature-axis target current value is greater than or equal to a second current threshold.

In some examples, the second current threshold is configured to be a sum of a quadrature-axis target current value corresponding to the upper limit of the rotational torque set by the torque setting device and a rotational speed current value corresponding to a current rotational speed of the electric motor.

In some examples, the torque setting device is configured to be an electronic torque ring.

In some examples, the power tool further includes a trigger switch for a user to start up the power tool and adjust the rotational speed of the power tool.

A power tool includes a housing, an electric motor, a driver circuit, a speed detection device, and a control device. The electric motor is disposed in the housing. The driver circuit is electrically connected to the electric motor to drive the electric motor to operate. The speed detection device is configured to acquire a rotational speed of the electric motor. The control device is connected to the speed detection device and the driver circuit and outputs a control signal to the driver circuit to control rotation of the electric motor. The control device is configured to, when the electric motor is in a start-up stage, acquire the rotational speed of the electric motor, estimate a rotational speed variation of the electric motor within a preset time based on the rotational speed of the electric motor, and control the rotational speed of the electric motor based on the rotational speed variation.

In some examples, when the electric motor is in the start-up stage, a first control signal is outputted to the driver circuit so as to control the rotation of the electric motor; and the first control signal is configured to be a pulse-width modulation (PWM) signal with a first duty cycle, where the first duty cycle is configured to be a variable and has a preset initial value.

In some examples, the control device is configured to acquire a current of the electric motor, control the first duty cycle to gradually increase from the initial value, and reduce the first duty cycle in the case where the current of the electric motor is greater than or equal to a first current threshold.

A control method of a power tool is provided. The power tool includes a housing, an electric motor, a driver circuit, a speed detection device, and a control device. The electric motor is disposed in the housing. The driver circuit is electrically connected to the electric motor to drive the electric motor to operate. The speed detection device is configured to acquire a rotational speed of the electric motor. The control device is electrically connected to at least the driver circuit to control the electric motor to operate. The control method includes when the electric motor is in a start-up stage, acquiring the rotational speed of the electric motor, estimating a rotational speed variation of the electric motor within a preset time based on the rotational speed of the electric motor, and turning off the electric motor when the rotational speed variation is less than a rotational speed variation threshold.

In some examples, when the electric motor is in the start-up stage, a first control signal is outputted to the driver circuit so as to control rotation of the electric motor; the first control signal is configured to be a pulse-width modulation (PWM) signal with a first duty cycle; and the control device is configured to acquire a current of the electric motor, control the first duty cycle to gradually increase from an initial value, and reduce the first duty cycle in the case where the current of the electric motor is greater than or equal to a first current threshold.

DETAILED DESCRIPTION

The present application is described below in detail in conjunction with drawings and examples.

Figure 1:
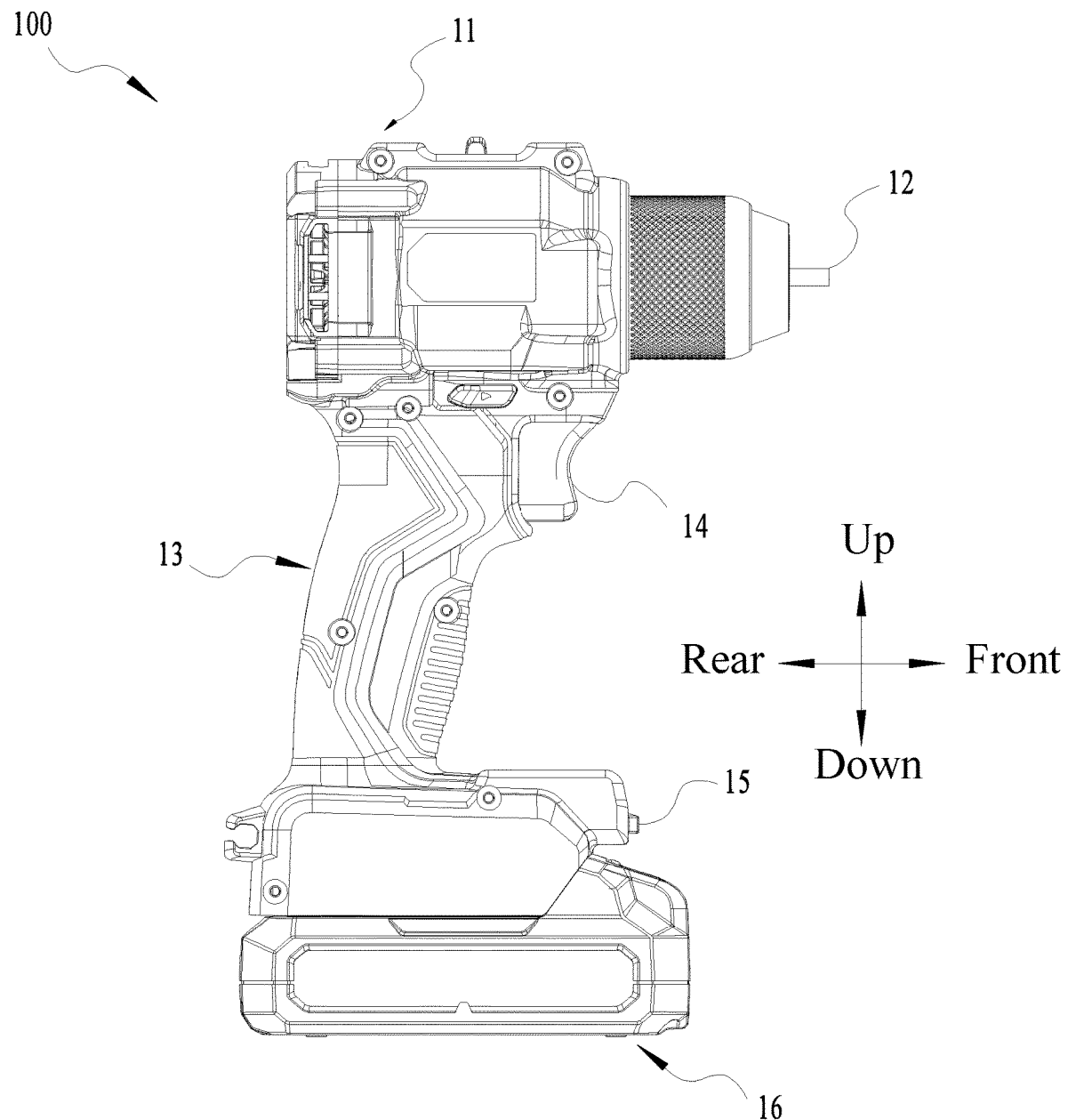
FIG. 1 is a perspective view of a specific example of the present application.

FIG. 1 shows an electric drill 100 as an example of a power tool. The electric drill can at least provide torque to assist a screw into a workpiece and can provide an impact force for an impact operation, so as to satisfy different usage requirements of a user. The following examples are part, not all, of examples of the present application. The technical solutions provided in the present application are applicable to most power tool. For example, the power tool can be a torque output tool, such as an impact wrench, an electric screwdriver, an electric scissor, and a chainsaw.

FIG. 1 is a perspective view of an electric drill 100 as a specific example. Referring to FIG. 1, the electric drill 100 mainly includes a housing 11, a tool element 12, a grip 13, a trigger switch 14, a torque setting device 15, and a power supply device 16. The housing 11 forms an inner cavity, and an electric motor 111 is disposed in the inner cavity. The inner cavity also accommodates a transmission device. A front end of the housing 11 is used for installing the tool element 12. The electric motor 111 sequentially drives the transmission device and an output shaft and then drives the tool element 12 to perform a machining operation on a workpiece to be machined. Different tool elements 12 may be adopted by different power tools. The tool element 12 in this example is a drill bit for driving a screw into the workpiece to be machined. The housing 11 is formed with the grip 13 for the hand of an operator to hold. The power supply device 16 is electrically connected to the electric drill 100 to supply power to the electric drill 100. The power supply device 16 may be a battery pack or a mains connector. In this example, the power supply device 16 is configured to be the battery pack, where the battery pack is detachably connected to the electric drill 100. The trigger switch 14 is used for implementing the functions of start-up and speed regulation of the electric motor 111, and the trigger switch 14 may be, but is not limited to, a trigger, a knob, a sliding mechanism, and the like. In this example, the trigger switch 14 is configured to be a trigger mechanism.

Figure 2:
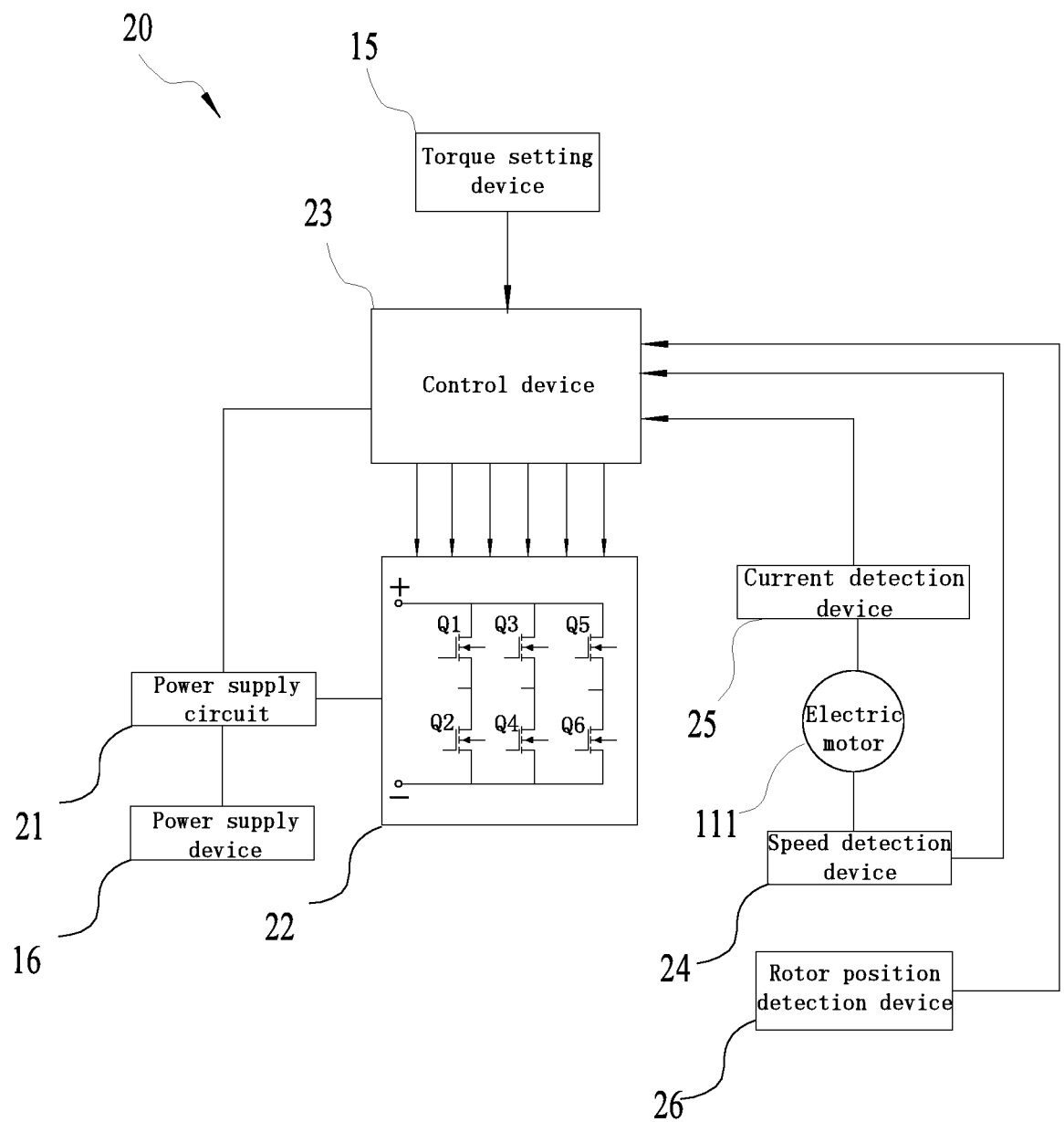
FIG. 2 is a block diagram of circuitry of a power tool in FIG. 1.

Referring to FIG. 2, the electric drill 100 further includes a control system 20 for controlling an operation state of the electric motor 111. The control system 20 includes at least a power supply circuit 21, a driver circuit 22, a control device 23, a speed detection device 24, a current detection device 25, and a rotor position detection device 26. The power supply circuit 21 is electrically connected to the power supply device 16 and configured to supply power to the electric motor 111. The driver circuit 22 is disposed between the electric motor 111 and the power supply circuit 21 and configured to apply a voltage outputted by the power supply circuit 21 across the electric motor 111 to ensure the normal operation of the electric motor 111. The control device 23 is electrically connected to the driver circuit 22, the speed detection device 24, the current detection device 25, and the rotor position detection device 26, separately. The speed detection device 24 is configured to acquire a rotational speed of the electric motor 111 in operation in real time. The current detection device 25 is configured to acquire a current of the electric motor 111 in operation in real time. The rotor position detection device 26 is configured to acquire a rotor position of the electric motor 111 in operation in real time. Specifically, the control device 23 controls the operation state of the electric motor 111 according to a current value acquired by the current detection device 25, the rotor position acquired by the rotor position detection device 26, and the rotation speed of the electric motor 111 acquired by the speed detection device 24. In some examples, the control device 23 is a dedicated controller such as some dedicated control chips (for example, a microcontroller unit (MCU)). The control device 23 is integrated with a signal processing unit, where the signal processing unit is configured to process acquired related parameter signals and has functions of calculation, comparison, and determination. After processing the signals, the signal processing unit can generate control signals and output the control signals to the driver circuit 22, so as to drive the electric motor 111 to operate. The driver circuit 22 is electrically connected to the control device 23 and the electric motor 111 and can drive, according to the control signals outputted by the control device 23, the electric motor 111 to operate.

The speed detection device 24 is configured to detect an actual rotational speed of the electric motor 111. In some examples, the speed detection device 24 includes a speed detection sensor disposed near or inside the electric motor 111 to acquire the actual rotational speed of the electric motor 111. In some examples, the speed detection device 24 includes a photoelectric sensor disposed near the electric motor 111 and capable of acquiring the rotational speed of the electric motor 111. In some examples, the speed detection device 24 includes a Hall sensor disposed near a rotor inside the electric motor 111 and capable of acquiring the actual rotational speed of the electric motor 111 according to a rotational speed of the rotor. In some examples, when the electric drill 100 operates at a high speed or in a high temperature state, the sensor has reduced detection accuracy or even fails. To solve this problem, the speed detection device 24 in the present application includes no sensor but estimates the actual rotational speed of the electric motor 111 through an electrical signal outputted by the electric motor 111. For example, the current of the electric motor 111 is detected, a zero-crossing of a back electromotive force of the electric motor 111 is obtained, and a periodic change law of the operation of the electric motor 111 is estimated so that the actual rotational speed of the electric motor 111 is estimated according to the periodic change law.

In this example, the electric motor 111 is a three-phase motor and has three-phase windings. The electric motor 111 may be an inner rotor motor or an outer rotor motor. In some examples, the electric motor 111 is an inner rotor permanent magnet synchronous brushless motor. In some examples, the electric motor 111 is an outer rotor permanent magnet synchronous brushless motor. The driver circuit 22 is electrically connected to the three-phase windings of the electric motor 111.

The driver circuit 22 includes a switching circuit, where the switching circuit is configured to drive, according to the control signals outputted by the control device 23, the rotor of the electric motor 111 to operate. To rotate the electric motor 111, the driver circuit 22 has multiple drive states. In one drive state, stator windings of the electric motor generate a magnetic field. The control device 23 is configured to output a corresponding drive signal to the driver circuit 22 according to a rotational position of the rotor of the electric motor 111 so that the driver circuit 22 switches a drive state, so as to change the state of the voltage or current applied to the windings of the electric motor 111, generate an alternating magnetic field, and drive the rotor to rotate, thereby driving the electric motor. The rotor position of the electric motor 111 may be obtained by the rotor position detection device 26. Specifically, the rotor position detection device 26 includes, for example, three Hall sensors disposed along a circumferential direction of the rotor of the electric motor 111. When the rotor rotates in and out of a preset range, signals of the Hall sensors vary, and an output signal of the rotor position detection device 26 also varies accordingly. In this manner, the position of the rotor of the electric motor may be known according to a detection signal outputted by the rotor position detection device 26.

The driver circuit 22 includes switching elements Q1, Q2, Q3, Q4, Q5, and Q6 that form a three-phase bridge. Q1, Q3, and Q5 are high-side switches, and Q2, Q4, and Q6 are low-side switches. Field-effect transistors, insulated-gate bipolar transistors (IGBTs) and the like may be selected as the switching elements Q1 to Q6. Control terminals of the switching elements are electrically connected to the control device 23, separately. On states of the switching elements Q1 to Q6 vary according to the control signals outputted by the control device 23, thereby changing the state of the voltage or current applied by the power supply circuit 21 to the windings of the electric motor 111, so that the electric motor 111 is driven to operate.

The current detection device 25 is connected to the electric motor 111 and configured to acquire a working current of the electric motor 111. In this example, the current detection device 25 is configured to acquire phase currents of phases of the electric motor 111. The current detection device 25 transmits the phase currents of the electric motor 111 to the control device 23. Of course, the current detection device 25 may also be configured to acquire a bus current of the electric motor 111.

According to different electric motors 111, the control device 23 may select a suitable control manner from at least two different control manners to control the operation of the electric motor. Specifically, the preceding control manner may be a filed oriented control (FOC) manner, a six-step commutation driving manner, or another control manner. The six-step commutation driving manner is a non-inductive control manner commonly used in the non-inductive control of a brushless direct current (BLDC) motor and is collectively referred to as a BLDC control manner hereinafter.

In some examples, the user operates the trigger switch 14 to start up the electric motor 111 and regulate an operation speed of the electric motor 111. The control device 23 acquires the real-time rotational speed of the electric motor 111 through the speed detection device 24 and compares the real-time rotational speed with a preset target rotational speed. When the real-time rotational speed of the electric motor is less than or equal to the preset target rotational speed, the electric motor is set to be in a start-up stage; and when the real-time rotational speed of the electric motor is greater than the preset target rotational speed, the electric motor is set to be in an operation stage. In this example, when the electric motor is in the start-up stage, the control device 23 uses a first control manner for controlling the electric motor to operate. Specifically, the first control manner is the BLDC control manner. When the electric motor is in the operation stage, the control device 23 uses a second control manner for controlling the electric motor to operate. Specifically, the second control manner is the FOC control manner or the BLDC control manner.

Figure 3:
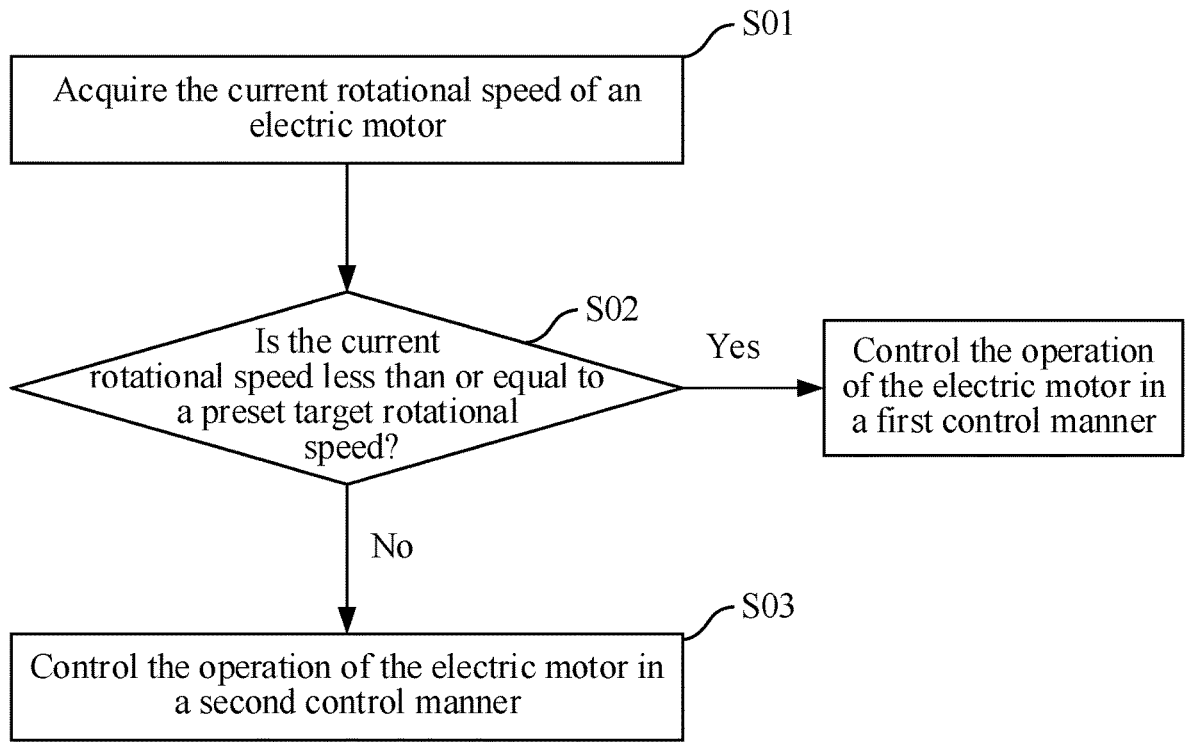
FIG. 3 is a flowchart of a control method in a start-up stage and an operation stage of an electric motor.

The flow of the method for controlling the electric drill 100 in the non-inductive control manner is described below in conjunction with FIG. 3. The method includes the steps described below.

In S01, a current speed of the electric motor is acquired.

In S02, whether the current speed of the electric motor is less than or equal to the preset target rotational speed is determined. If so, the operation of the electric motor is controlled in the first control manner. If not, step S03 is performed.

In S03, the operation of the electric motor is controlled in the second control manner.

In the preceding examples, whether the electric motor is in the start-up stage or the operation stage is determined based on the speed of the electric motor. Of course, other motor parameters may also be used, such as the current of the electric motor. There is no limitation here.

In some examples, the control device 23 outputs a first control signal to the driver circuit to control the electric motor to start. Specifically, the first control signal is configured to be a pulse-width modulation (PWM) signal with a first duty cycle D1. The first duty cycle D1 is configured to be a variable. In some examples, the first duty cycle D1 has a relatively small initial value. During the start-up of the electric motor, the first duty cycle D1 gradually increases from the relatively small initial value until the speed of the electric motor reaches the preset target rotational speed. During the start-up of the electric motor, the control device 23 acquires the current of the electric motor, compares the current of the electric motor with a first current threshold, and reduces the first duty cycle D1 of the first control signal when the current of the electric motor is greater than or equal to the first current threshold so that the current flowing through the electric motor is reduced. After the current flowing through the electric motor is reduced, the first duty cycle D1 is increased again so that the current flowing through the electric motor is in the state of being relatively constant.

The advantage is that it can be ensured that the electric motor has stable output in the start-up stage, and the first duty cycle D1 is adjusted through the change of the current of the electric motor, so as to ensure that the electric motor has relatively stable output while the electric motor can be started normally, and the current flowing through the electric motor is in the state of being constant.

Figure 4:
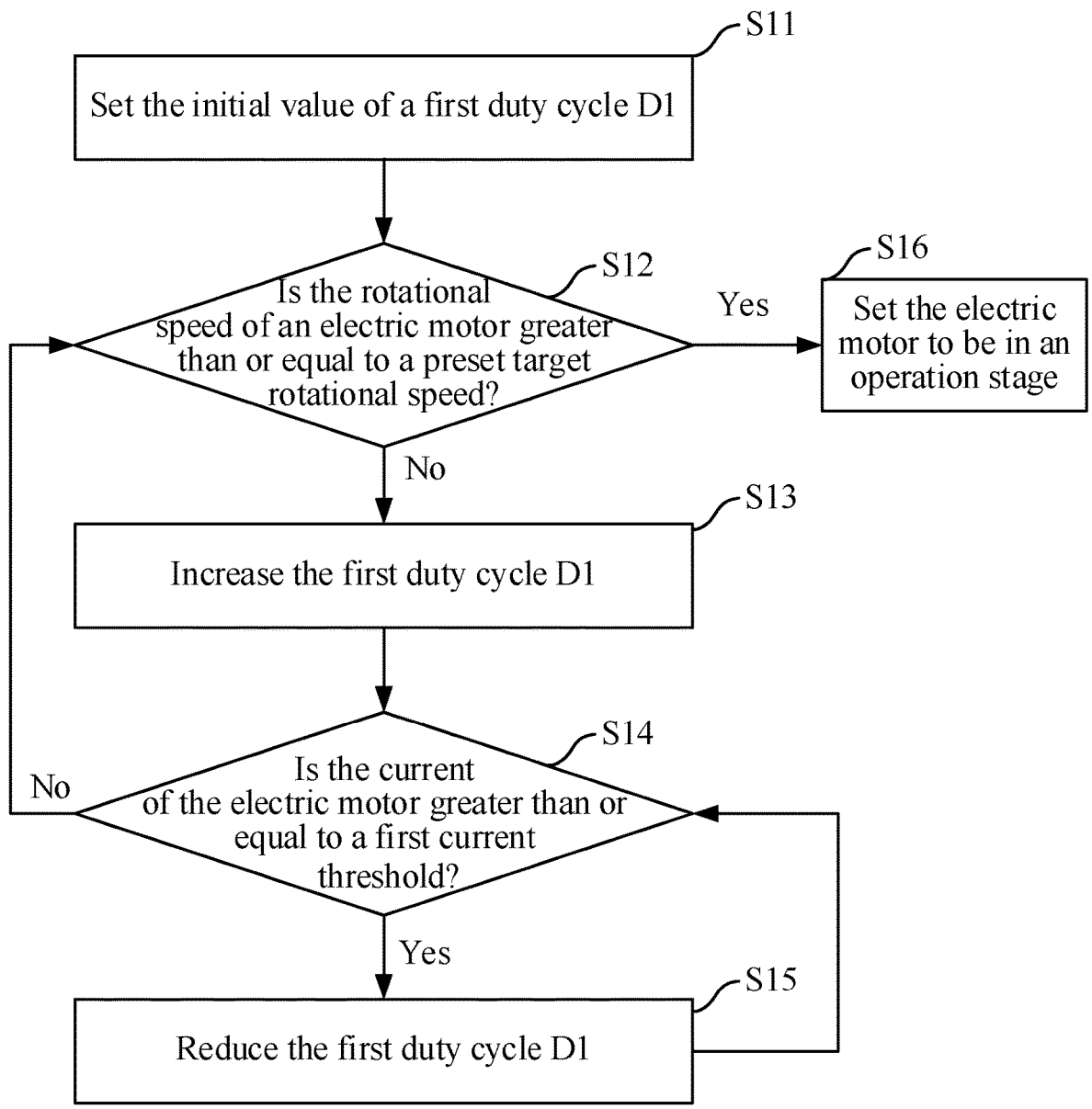
FIG. 4 is a flowchart of a control method in a start-up stage of an electric motor according to an example.

A current control method in the start-up stage of the electric motor is described below in conjunction with FIG. 4. The method includes the steps described below.

In S11, the initial value of the first duty cycle D1 is set.

In S12, whether the rotational speed of the electric motor is greater than the preset target rotational speed is determined. If so, step S16 is performed. If not, step S13 is performed.

In S13, the first duty cycle D1 is increased.

In S14, whether the current of the electric motor is greater than or equal to the first current threshold is determined. If so, step S15 is performed. If not, step S12 is performed.

In S15, the first duty cycle D1 is reduced and then step S14 is performed.

In S16, the electric motor is controlled to enter the operation stage.

In some other examples, the control device 23 outputs a second control signal to the driver circuit to control the electric motor to start. Specifically, the second control signal is configured to be a PWM signal with a second duty cycle D2. The second duty cycle D2 is configured to be a fixed value greater than the initial value of the first duty cycle D1. When the electric motor is in the start-up stage, the control device 23 acquires the current of the electric motor in operation through the current detection device 25 and compares the current with the first current threshold. When the current of the electric motor detected by the current detection device 25 is greater than the first current threshold, the electric motor is turned off so as to cut off the current flowing to the electric motor. Since the second control signal is specifically configured to be the PWM signal with the second duty cycle D2 and the PWM signal has a fixed switching cycle, after the control device 23 turns off the electric motor when detecting that the current of the electric motor is greater than or equal to the first current threshold, the electric motor is started at the beginning of a next switching cycle. It is to be understood that the PWM signal with the second duty cycle D2 drives the electric motor to operate until the rotational speed of the electric motor reaches the preset target rotational speed.

Figure 5:
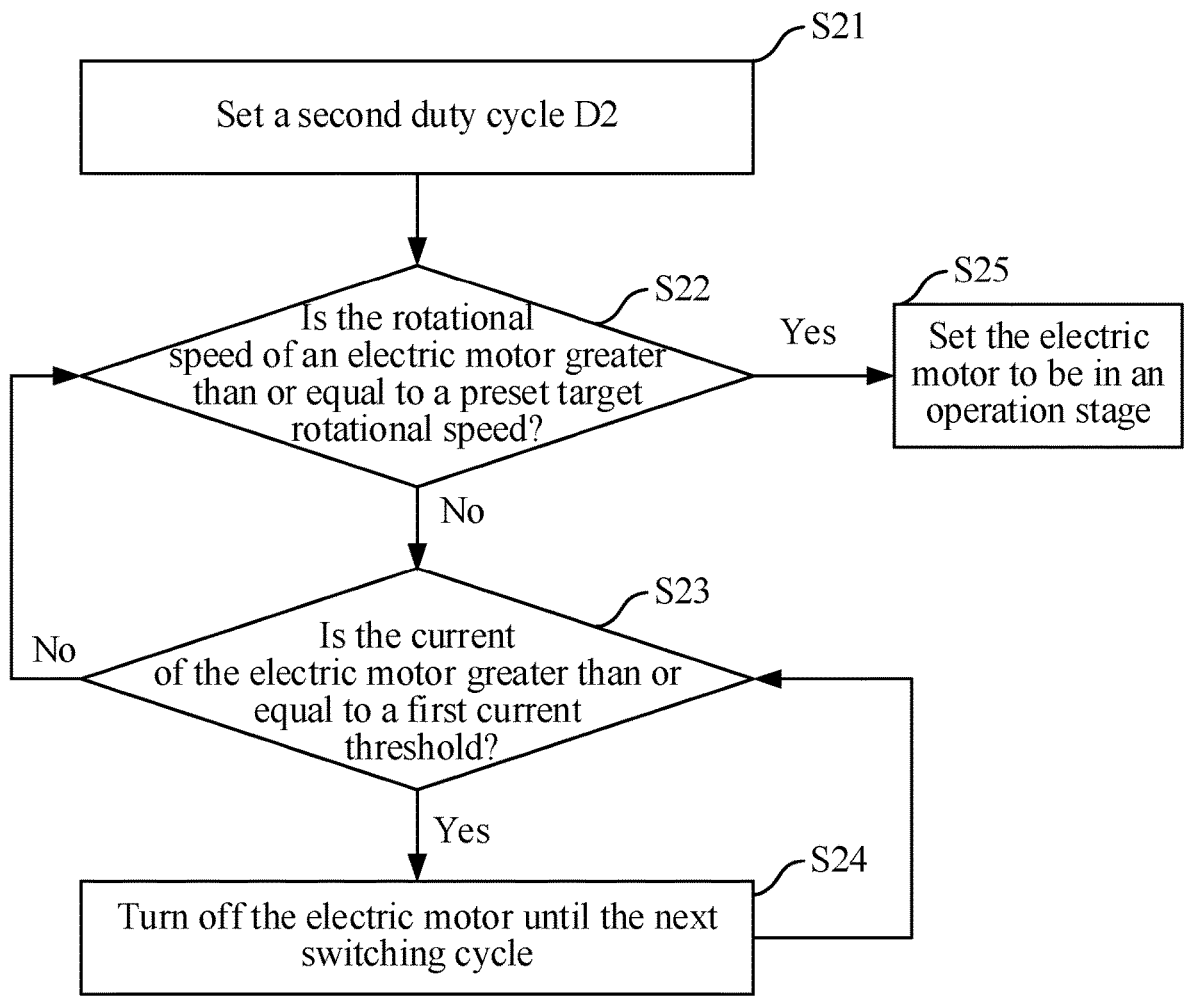
FIG. 5 is a flowchart of a control method in a start-up stage of an electric motor according to another example.

Another current control method in the start-up stage of the electric motor is described below in conjunction with FIG. 5. The method includes the steps described below.

In S21, the second duty cycle D2 is set.

In S22, whether the rotational speed of the electric motor is greater than the preset target rotational speed is determined. If so, step S25 is performed. If not, step S23 is performed.

In S23, whether the current of the electric motor is greater than the first current threshold is determined. If so, step S24 is performed. If not, step S22 is performed.

In S24, the electric motor is turned off until the next switching cycle, and then step S23 is performed.

In S25, the electric motor is set to be in the operation stage.

Two different current control methods in the start-up stage of the electric motor are introduced above. In the two methods, the current of the electric motor is compared with the first current threshold so as to determine whether the current of the electric motor needs to be limited, and at the same time, the current flowing through the electric motor is set to be in the state of being constant. The difference between the preceding two examples is different duty cycles of control signals. Specifically, the initial value of the first duty cycle D1 is configured to be relatively small, and then the first duty cycle D1 is continuously increased with the operation of the electric motor. When the current flowing through the electric motor is greater than or equal to the first current threshold, the first duty cycle D1 is reduced so as to reduce the current flowing through the electric motor. When it is detected that the current flowing through the electric motor is less than the first current threshold, the first duty cycle D1 continues to be increased so that the current flowing through the electric motor is not reduced too much. In this manner, it can be ensured that the current flowing through the electric motor is in the state of being relatively constant. In the second example, the second duty cycle D2 is set to be the fixed value. It is to be noted that the second duty cycle D2 is greater than the first duty cycle D1 in the first example. When it is detected that the current flowing through the electric motor is greater than or equal to the first current threshold, the electric motor is turned off. When the next switching cycle of the PWM signal arrives, the electric motor is restarted so as to restore the current flowing to the electric motor. In this manner, it can also be ensured that the current flowing through the electric motor is in the state of being relatively constant.

In some examples, the control device 23 does not distinguish between the start-up stage and the operation stage of the electric motor, and it is to be understood that the BLDC control manner is adopted in both the start-up stage and the operation stage of the electric motor. In some other examples, the control device 23 adopts the FOC control manner in both the start-up stage and the operation stage of the electric motor. In some examples, by detecting a load state, the control device 23 determines which control manner is used for starting the electric motor.

In some examples, the control device 23 does not need to detect the manner of starting the electric motor and directly uses the first control manner for controlling the start-up of the electric motor. For example, the BLDC control manner is directly used for controlling the start-up of the electric motor. When the rotational speed of the electric motor reaches the preset target rotational speed, the electric motor enters the operation stage. When the electric motor is in the operation stage, the second control manner is used for controlling the electric motor to operate. For example, the FOC control manner is directly used for controlling the electric motor to operate.

Specifically, in the FOC control manner, the control device 23 controls the driver circuit 22 so that a voltage of the electric motor varies with the rotor position of the electric motor in a sine wave or a saddle wave. A direct axis is a direction of a magnetic field of the rotor, a quadrature axis is perpendicular to the direction of the magnetic field of the rotor, a direct-axis target current is in the same direction as the direct axis, and a quadrature-axis target current is in the same direction as the quadrature axis. The quadrature-axis target current is an exciting current and used for controlling torque and generating the torque perpendicular to the rotor to drive the rotor to rotate. The principle is that electromagnetic torque of the electric motor is controlled by a torque current to be able to drive the rotation of the rotor to the maximum extent, so as to improve the efficiency and heavy load performance of the electric motor. The quadrature-axis target current and the direct-axis target current may be obtained through calculations. Specifically, the control device 23 acquires the current of the electric motor in the operation stage through the current detection device 25 and can obtain the quadrature-axis target current and the direct-axis target current through theoretical calculations.

In some examples, as shown in FIG. 1, the electric drill 100 further includes the torque setting device 15 for the user to select a suitable torque range. The torque setting device 15 is disposed at least partially on a surface of the housing 11 of the electric drill 100 for the user to operate. The torque setting device 15 is electrically connected to the control device 23, the user can select a required torque gear through the torque setting device 15, and each torque gear corresponds to an upper limit of the torque. The torque setting device 15 in this example is preferably an electronic torque ring. The quadrature-axis target current may be acquired through formula calculation, after the control device 23 acquires the torque gear currently set by the torque setting device 15, a preset torque current threshold corresponding to the torque gear can be acquired through calculation and analysis. It is to be understood that, in actual use, the user selects different torque gears through the torque setting device 15, each torque gear corresponds to the maximum torque that the electric drill 100 can output under the torque gear, the torque current corresponding to each maximum torque can be obtained through formula calculation, and the torque current here is defined as the torque current threshold of each torque gear of the torque setting device 15. When the electric motor is in the operation stage, to protect the electric drill 100 from over-torque, the control device 23 acquires the current of the electric motor through the current detection device 25 and obtains the quadrature-axis target current through calculation. When the quadrature-axis target current is greater than or equal to the torque current threshold corresponding to the torque gear currently set by the torque setting device 15, the control device 23 turns off the electric motor to achieve the over-torque protection of the electric drill 100 to protect the electric motor. However, since the user regulates the speed of the electric drill 100 through the trigger switch 14 during use to enable the tool to satisfy usage requirements, different states of the trigger switch 14 correspond to different rotational speeds of the electric motor. To enable the electric drill 100 to have stable torque output at different rotational speeds, it is to be understood that the output torque of the electric drill 100 is the same at different rotational speeds. Next, how to ensure that the output torque of the electric drill 100 is consistent at different rotational speeds under a preset torque gear is described in detail below.

The control device 23 acquires the phase currents of the electric motor in operation through the current detection device 25 and obtains the quadrature-axis target current corresponding to the current phase currents through analysis and calculation. When the quadrature-axis target current is greater than or equal to a second current threshold, the control device 23 turns off the electric motor to achieve the over-torque protection. Specifically, the size of the second current threshold varies with the state of the torque setting device 15 and the rotational speed of the electric motor. In the preceding examples, it has been described that each torque gear of the torque setting device 15 corresponds to one torque current threshold. It is to be noted that the preceding torque current threshold is not the second current threshold. In other words, the torque current threshold is further corrected so as to obtain the second current threshold. Next, a method for setting the second current threshold is described in detail.

In some examples, the second current threshold is configured to be a sum of the torque current threshold and a rotational speed current threshold of the electric motor. The method for setting the torque current threshold is described in detail in the preceding examples. Next, a method for setting the rotational speed current threshold is described in detail.

In some examples, the rotational speed of the electric motor is controlled by the trigger switch 14. Generally, the larger a triggering stroke of the trigger switch 14, the greater the rotational speed of the electric motor. When the electric motor is in a load-free state, the trigger switch 14 is controlled so that the electric motor operates under multiple rotational speed gears; the phase currents of the electric motor under each rotational speed gear are obtained, and the corresponding quadrature-axis target current is further obtained, where the quadrature-axis target current is configured to be the rotational speed current threshold under the rotational speed gear. The torque current threshold and the rotational speed current threshold are both preset. Those skilled in the art may design how many gears the rotational speed is divided and how many gears the torque is divided. It is to be understood that the design is performed according to the preceding solution, and after the torque setting device 15 sets the torque gear, the second current thresholds are different under different rotational speed gears, so as to ensure that the electric drill 100 can output relatively stable torque under the same torque gear regardless of whether the rotational speed is large or small, thereby ensuring the consistency of torque output.

When the electric motor is in the operation stage, the control device 23 can acquire the torque current threshold corresponding to the current torque gear through the torque setting device 15. When the electric motor is operating, the control device 23 detects the real-time rotational speed of the electric motor through the speed detection device 24, acquires the rotational speed gear corresponding to the current rotational speed, and then acquires the corresponding rotational speed current threshold so that the second current threshold is determined by the torque current threshold and the rotational speed current threshold determined by the real-time rotational speed of the electric motor. Specifically, the second current threshold is configured to be a sum of the torque current threshold and the rotational speed current threshold. It is to be noted that the second current threshold in the present application varies with the rotational speed of the electric motor. When the quadrature-axis target current acquired through the phase currents of the electric motor detected by the current detection device 25 is greater than or equal to the second current threshold, the control device 23 controls the electric motor to be turned off, thereby achieving the over-torque protection of the electric drill 100.

Figure 6:
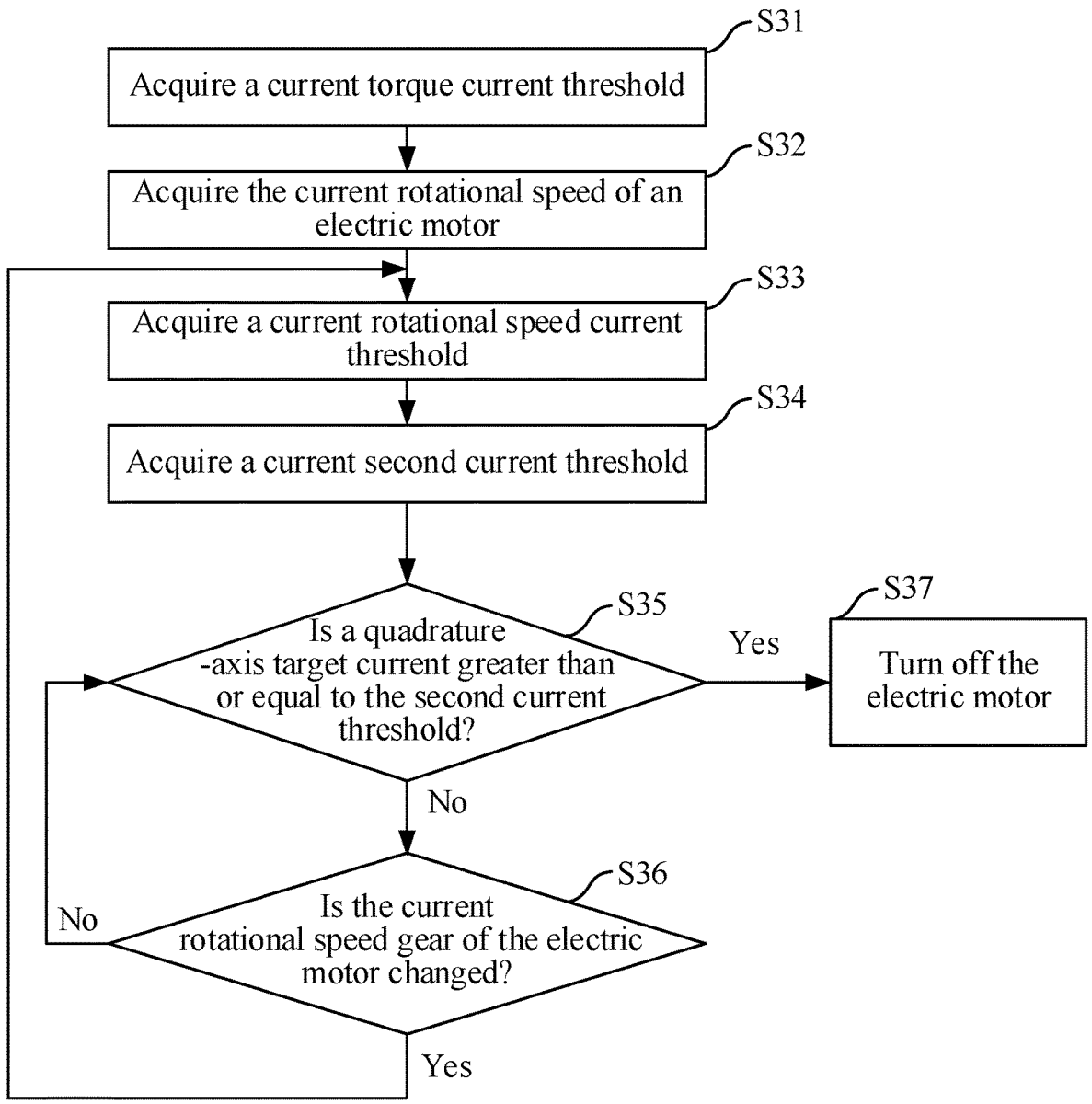
FIG. 6 is a flowchart of a control method of output torque in an operation stage of an electric motor.

A current control method in the operation stage of the electric motor is described below in conjunction with FIG. 6. The method includes the steps described below.

In S31, the torque current threshold corresponding to the torque gear selected by the torque setting device is acquired.

In S32, the current rotational speed of the electric motor is acquired.

In S33, the rotational speed gear corresponding to the current rotational speed of the electric motor is acquired and the corresponding rotational speed current threshold is acquired.

In S34, the current second current threshold is acquired.

In S35, whether the current quadrature-axis target current of the electric motor is greater than or equal to the second current threshold is determined. If so, step S37 is performed. If not, step S36 is performed.

In S36, whether the current rotational speed gear of the electric motor is changed is determined. If so, step S33 is performed. If not, step S35 is performed.

In S37, the electric motor is turned off.

In the preceding example, in the operation stage of the electric drill, the second current threshold is set so as to control the output torque of the electric drill, thereby avoiding the phenomenon of over-torque of the electric drill during use. On the other hand, in order that the maximum torque for the over-torque protection of the electric drill under the same torque gear but at different rotational speeds is the same, the second current threshold is configured to be the sum of the torque current threshold and the rotational speed current threshold so that the second current thresholds under different rotational speed gears can all ensure that the maximum torque for the over-torque protection is the same.

In some examples, when the user performs a nailing operation with the electric drill 100, after a nail is driven into a surface of the workpiece, a locking operation is performed so as to ensure that the nail is completely fastened into the workpiece. It is to be understood that when the user performs the locking operation, the electric motor is in an on-load state. When the electric drill is in the on-load state, the electric drill needs to be protected from over-torque. To perform the over-torque protection in the on-load state during the locking operation without affecting the normal operation of the electric motor in the start-up stage so as to transition to the operation stage of the electric motor, a more accurate control method is provided in this example, which is described in detail below.

When the electric motor is in the start-up stage, the control device 23 acquires the rotational speed of the electric motor through the speed detection device 24, acquires a rotational speed variation according to the rotational speed, and turns off the electric motor when the detected rotational speed variation is less than a rotational speed variation threshold. In this example, the rotational speed variation is configured to be rotational speed acceleration, and the rotational speed variation threshold is configured to be an acceleration threshold. When the electric motor is in the start-up stage, the control device 23 acquires the rotational speed of the electric motor in operation through the speed detection device 24, obtains the real-time acceleration of the electric motor after calculation and analysis, and turns off the electric motor when the real-time acceleration of the electric motor is less than a preset acceleration threshold, thereby achieving the over-torque protection of the electric motor. It is to be understood that when the electric motor is in the start-up stage in the load-free state, the rotational speed of the electric motor increases relatively quickly; and when the rotational speed of the electric motor reaches the preset target rotational speed, the electric motor enters the operation stage. When the electric motor is in the start-up stage in the on-load state, that is, during the locking operation, since the electric motor is in the on-load state, the rotational speed of the electric motor increases relatively slowly. It is to be understood that the real-time acceleration of the electric motor is relatively small, and when the real-time acceleration of the electric motor is less than the preset acceleration threshold, the control device 23 turns off the electric motor, thereby achieving the over-torque protection. It is to be understood that the acceleration of the electric motor is an exemplary motor parameter in this example, but those skilled in the art should understand that whether the electric motor has a load in the start-up stage is determined according to the change of the rotational speed of the electric motor, which is not limited to the acceleration.

Figure 7:
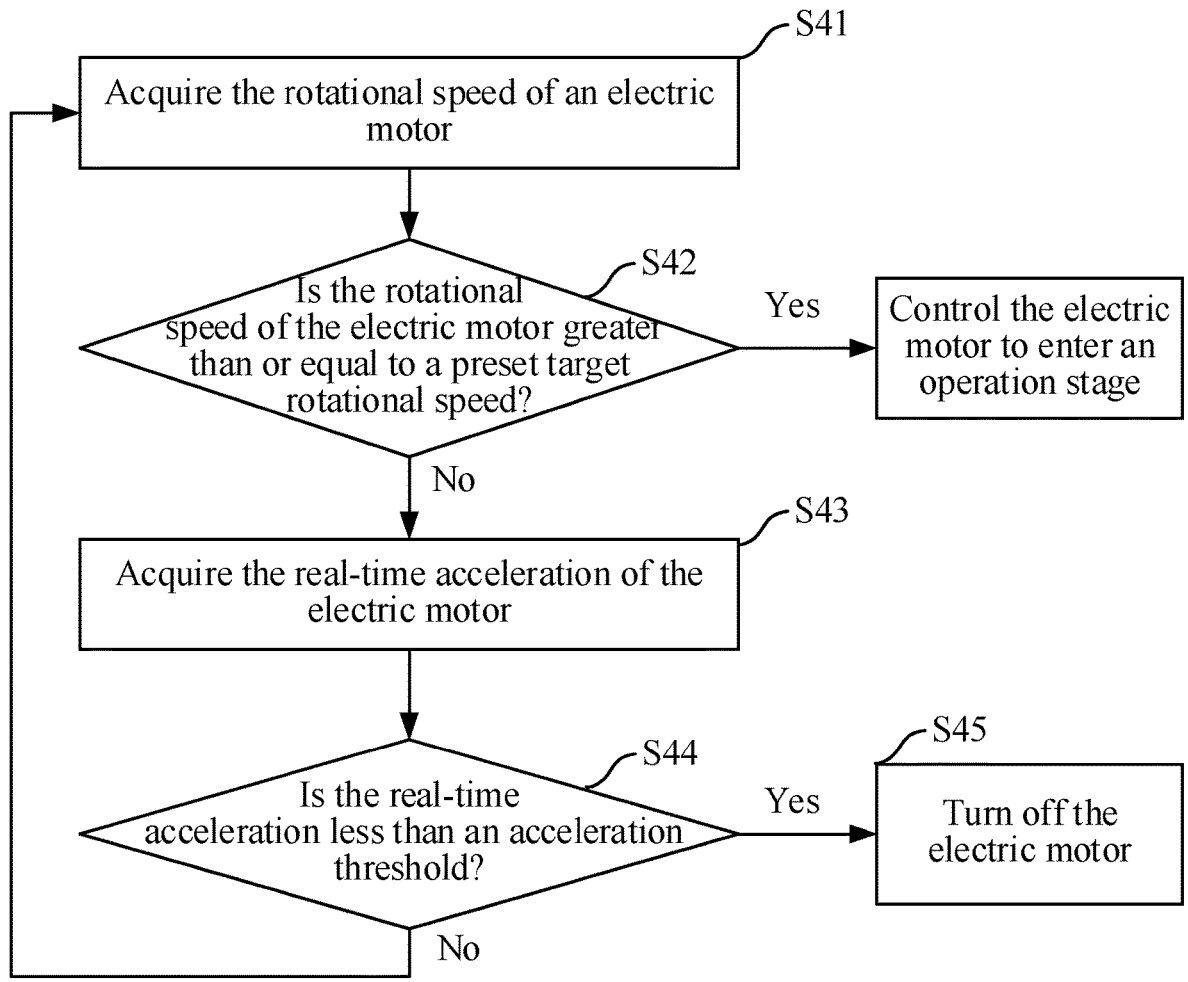
FIG. 7 is a flowchart of a control method of output torque in a start-up stage of an electric motor.

A current control method in the start-up stage of the electric drill is described below in conjunction with FIG. 7. The method includes the steps described below.

In S41, the real-time rotational speed is acquired.

In S42, whether the rotational speed of the electric motor is greater than or equal to the preset target rotational speed is determined. If so, the electric motor is controlled to enter the operation stage. If not, step S43 is performed.

In S43, the real-time acceleration of the electric motor is acquired.

In S44, whether the real-time acceleration of the electric motor is less than the preset acceleration threshold is determined. If so, step S45 is performed. If not, step S41 is performed.

In S45, the electric motor is turned off.

In the preceding example, the rotational speed of the electric motor is sampled in real time, the real-time acceleration of the electric motor is obtained, and whether the real-time acceleration is less than the preset acceleration threshold is determined so that whether the electric motor currently needs the over-torque protection is determined. It is to be noted here that in this example, the acceleration is obtained by the rotational speed and then compared with the threshold. It is to be understood that the rotational speed variation within a certain time is within the scope of the present application, which is not limited to the acceleration.

It is to be noted that the above are only preferred examples of the present application and the technical principles used therein. It is to be understood by those skilled in the art that the present application is not limited to the examples described herein. For those skilled in the art, various apparent modifications, adaptations, and substitutions based on the description set forth in the present application can be made without departing from the scope of the present application. Therefore, while the present application is described in detail in conjunction with the preceding examples, the present application is not limited to the preceding examples and may include equivalent examples without departing from the concept of the present application. The scope of the present application is determined by the scope of the appended claims.

What is claimed is:

1. A power tool, comprising:
a housing;
an electric motor disposed in the housing;
a driver circuit electrically connected to the electric motor to drive the electric motor to operate;
a speed detection device configured to acquire a rotational speed of the electric motor; and
a control device connected to the speed detection device and the driver circuit, wherein the control device outputs a control signal to the driver circuit to control rotation of the electric motor;

the control device is configured to:
  acquire the rotational speed of the electric motor, and control the motor to be in a start-up stage when the rotational speed of the electric motor is less than or equal to a preset target rotational speed;
  when the electric motor is in the start-up stage, obtain a rotational speed variation of the electric motor within a preset time based on the rotational speed of the electric motor, and turn off the electric motor when the rotational speed variation is less than a rotational speed variation threshold.

2. The power tool of claim 1, wherein the control device is further configured to control the electric motor to be in the start-up stage when the rotational speed of the electric motor is less than or equal to a preset target rotational speed and control the electric motor to be in an operation stage in when the rotational speed of the electric motor is greater than the preset target rotational speed.

3. The power tool of claim 2, wherein the control device is configured to output a first control signal to the driver circuit to control the rotation of the electric motor when the electric motor is in the start-up stage.

4. The power tool of claim 3, wherein the first control signal is configured to be a pulse-width modulation (PWM) signal with a first duty cycle, and the first duty cycle is configured to be a variable having a preset initial value.

5. The power tool of claim 4, wherein the control device is configured to acquire a current of the electric motor, control the first duty cycle to gradually increase from the preset initial value, and reduce the first duty cycle when the current of the electric motor is greater than or equal to a first current threshold.

6. The power tool of claim 2, wherein the control device is configured to output a second control signal to the driver circuit to control the rotation of the electric motor when the electric motor is in the start-up stage, the second control signal is configured to be a PWM signal with a second duty cycle, and the second duty cycle is configured to be a fixed value.

7. The power tool of claim 6, wherein the control device is configured to acquire a current of the electric motor, turn off the electric motor when the current of the electric motor is greater than or equal to a first current threshold, and power on the electric motor again at a beginning of a next cycle of the second control signal.

8. The power tool of claim 1, further comprising a power supply device, wherein the power supply device is connected to at least the electric motor and configured to supply power to the electric motor.

9. The power tool of claim 2, further comprising a torque setting device configured to receive a torque setting instruction inputted by a user to set an upper limit of rotational torque outputted by the power tool.

10. The power tool of claim 9, wherein the electric motor comprises at least a stator and a rotor, and the control device is further configured to acquire a quadrature-axis target current value perpendicular to a direction of a magnetic field of the rotor when the electric motor is operating.

11. The power tool of claim 10, wherein the control device is configured to turn off the electric motor when the quadrature-axis target current value is greater than or equal to a second current threshold.

12. The power tool of claim 11, wherein the second current threshold is configured to be a sum of a torque current threshold corresponding to the upper limit of the rotational torque set by the torque setting device and a rotational speed current threshold corresponding to a current rotational speed of the electric motor.

13. The power tool of claim 1, further comprising a trigger switch for a user to start up the power tool and adjust the rotational speed of the power tool.

14. A power tool, comprising:
  a housing;
  an electric motor disposed in the housing;
  a driver circuit electrically connected to the electric motor to drive the electric motor to operate;
  a speed detection device configured to acquire a rotational speed of the electric motor; and
  a control device connected to the speed detection device and the driver circuit, wherein the control device outputs a control signal to the driver circuit to control rotation of the electric motor;
  the control device is configured to:
    acquire the rotational speed of the electric motor, and control the motor to be in a start-up stage when the rotational speed of the electric motor is less than or equal to a preset target rotational speed;
    when the electric motor is in the start-up stage, obtain a rotational speed variation of the electric motor within a preset time based on the rotational speed of the electric motor, and turn off the electric motor when the rotational speed variation is less than a rotational speed variation threshold.

15. The power tool of claim 14, wherein a first control signal is outputted to the driver circuit so as to control the rotation of the electric motor when the electric motor is in the start-up stage, the first control signal is configured to be a pulse-width modulation (PWM) signal with a first duty cycle, and the first duty cycle is configured to be a variable having a preset initial value.

16. The power tool of claim 15, wherein the control device is configured to acquire a current of the electric motor, control the first duty cycle to gradually increase from the initial value, and reduce the first duty cycle when the current of the electric motor is greater than or equal to a first current threshold.

17. A control method of a power tool, wherein the power tool comprises:
  a housing;
  an electric motor disposed in the housing;
  a driver circuit electrically connected to the electric motor to drive the electric motor to operate;
  a speed detection device configured to acquire a rotational speed of the electric motor; and
  a control device electrically connected to at least the driver circuit to control the electric motor to operate;
  wherein the control method comprises:
  acquiring the rotational speed of the electric motor when the electric motor is in a start-up stage, obtaining a rotational speed variation of the electric motor within a preset time based on the rotational speed of the electric motor, and turning off the electric motor when the rotational speed variation is less than a rotational speed variation threshold.

18. The control method of claim 17, further comprising:
  outputting a first control signal to the driver circuit so as to control rotation of the electric motor when the electric motor is in the start-up stage, wherein the first control signal is configured to be a pulse-width modulation (PWM) signal with a first duty cycle;
  acquiring a current of the electric motor and controlling the first duty cycle to gradually increase from an initial value; and reducing the first duty cycle when the current of the electric motor is greater than or equal to a first current threshold.

\* \* \* \* \*

UNITED STATES PATENT AND TRADEMARK OFFICE
CERTIFICATE OF CORRECTION

| | | |
|---|---|---|
| PATENT NO. | : 12,119,716 B2 | Page 1 of 1 |
| APPLICATION NO. | : 17/903439 | |
| DATED | : October 15, 2024 | |
| INVENTOR(S) | : Guang Li, Yanqing Xu and Yongkang Wu | |

It is certified that error appears in the above-identified patent and that said Letters Patent is hereby corrected as shown below:

On the Title Page

Item (30) Foreign Application Priority Data should read:
October 27, 2021 (CN) ................ 202111253712

Signed and Sealed this
Eighteenth Day of February, 2025

Coke Morgan Stewart
*Acting Director of the United States Patent and Trademark Office*